United States Patent
Tan et al.

(10) Patent No.: US 12,529,899 B2
(45) Date of Patent: Jan. 20, 2026

(54) ELECTRONIC DEVICE DISPLAY HAVING A SELECTIVE LIGHT REDIRECTING LAYER

(71) Applicant: Apple Inc., Cupertino, CA (US)

(72) Inventors: Guanjun Tan, Santa Clara, CA (US); Glenn M. Schuster, Woodside, CA (US); Jin Yan, San Jose, CA (US); Mehmet Mutlu, Grover Beach, CA (US); Giovanni Carbone, Palo Alto, CA (US); Enkhamgalan Dorjgotov, Sunnyvale, CA (US)

( * ) Notice: Subject to any disclaimer, the term of this patent is extended or adjusted under 35 U.S.C. 154(b) by 328 days.

(21) Appl. No.: 18/258,951

(22) PCT Filed: Jan. 3, 2022

(86) PCT No.: PCT/US2022/011035
§ 371 (c)(1),
(2) Date: Jun. 22, 2023

(87) PCT Pub. No.: WO2022/150267
PCT Pub. Date: Jul. 14, 2022

(65) Prior Publication Data
US 2024/0045210 A1    Feb. 8, 2024

Related U.S. Application Data

(60) Provisional application No. 63/134,106, filed on Jan. 5, 2021.

(51) Int. Cl.
*G02B 27/01* (2006.01)
*G02B 27/00* (2006.01)

(52) U.S. Cl.
CPC ..... *G02B 27/0172* (2013.01); *G02B 27/0068* (2013.01)

(58) Field of Classification Search
CPC ............ G02B 27/0172; G02B 27/0068; G02B 26/06; G02B 27/286
See application file for complete search history.

(56) References Cited

U.S. PATENT DOCUMENTS

| 10,386,558 B2 | 8/2019 | Escuti et al. |
| 10,466,496 B2 | 11/2019 | Parsons |

(Continued)

OTHER PUBLICATIONS

Edmund Optics Worldwide, An Introduction to Polarization Directed Flat Lenses, 2016, pp. 1-16, Edmund Optics Inc.

*Primary Examiner* — Mariam Qureshi
(74) *Attorney, Agent, or Firm* — Treyz Law Group, P.C.; Joseph F. Guihan; Jinie M. Guihan

(57) ABSTRACT

A display may include a display panel that emits light. The light from the display panel may be focused by a lens assembly towards a viewer. A light redirecting layer may be included in the display between the display panel and the lens assembly to ensure that the lens assembly receives incident light at an optimal angle. The light redirecting layer may redirect light by different amounts at different portions of the light redirecting layer. The magnitude of the redirection angle may increase with increasing separation from the center of the light redirecting layer. The light redirecting layer may redirect light away from the center of the light redirecting layer. The light redirecting layer may be a geometric phase lens formed using a liquid crystal film. The display may also include a circular polarizer, an additional circular polarizer, and an additional quarter waveplate.

18 Claims, 12 Drawing Sheets

(56) References Cited

U.S. PATENT DOCUMENTS

| | | |
|---|---|---|
| 10,718,947 B1 | 7/2020 | Lam |
| 2018/0275410 A1 | 9/2018 | Yeoh et al. |
| 2019/0049732 A1 | 2/2019 | Lee et al. |
| 2019/0285891 A1* | 9/2019 | Lam ..................... G02B 27/286 |
| 2020/0341268 A1* | 10/2020 | Amirsolaimani .... G02B 5/3083 |
| 2020/0348528 A1* | 11/2020 | Jamali ............... G02F 1/133536 |

* cited by examiner

ELECTRONIC DEVICE DISPLAY HAVING A SELECTIVE LIGHT REDIRECTING LAYER

This application claims priority to U.S. provisional patent application No. 63/134,106, filed Jan. 5, 2021, which is hereby incorporated by reference herein in its entirety.

BACKGROUND

This relates generally to electronic devices, and, more particularly, to electronic devices with displays.

Electronic devices often include displays. For example, an electronic device may have a liquid crystal display (LCD) based on liquid crystal display pixels or an organic light-emitting diode (OLED) display based on organic light-emitting diode pixels. Displays sometimes may have lower than desired efficiency and/or non-uniformities between different colors at certain viewing angles.

It would therefore be desirable to be able to provide improved displays for electronic devices.

SUMMARY

An electronic device may have a display such as a liquid crystal display or an organic light-emitting diode display. The display may have a display panel with an array of display pixels. The display pixels may include pixels that emit different colors of light such as red pixels, green pixels, and blue pixels.

Light from the display panel may be focused by a lens assembly towards a viewer. A light redirecting layer may be included between the display panel and the lens assembly to ensure that the lens assembly receives incident light at an optimal angle. The light redirecting layer may redirect light by different amounts at different portions of the light redirecting layer, depending on the properties of the lens assembly.

The light redirecting layer may not substantially redirect light at the center of the light redirecting layer. The magnitude of the redirection angle may increase with increasing separation from the center of the light redirecting layer. The light redirecting layer may redirect light away from the center of the light redirecting layer. The light redirecting layer may be a geometric phase lens formed using a liquid crystal film.

The display may therefore include the light redirecting layer over the display panel. The display may also include a circular polarizer, an additional circular polarizer, and an additional quarter waveplate.

DETAILED DESCRIPTION

Figure 1:
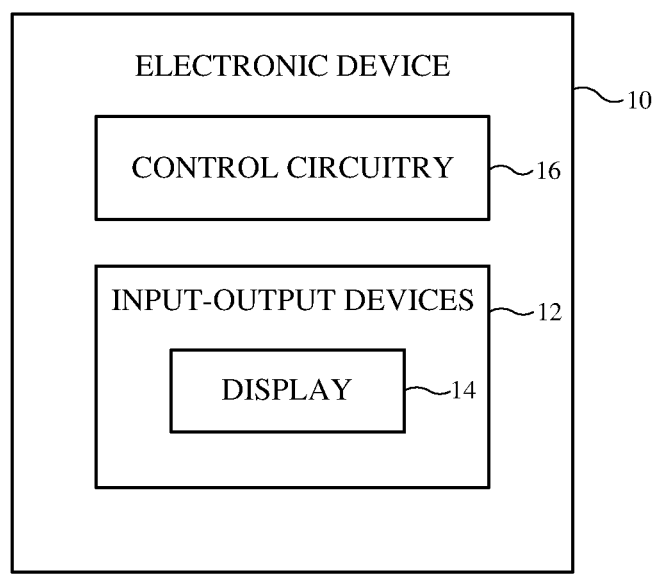
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user. As examples, electronic device 10 may be an augmented reality (AR) headset and/or virtual reality (VR) headset.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, keypads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Figure 2:
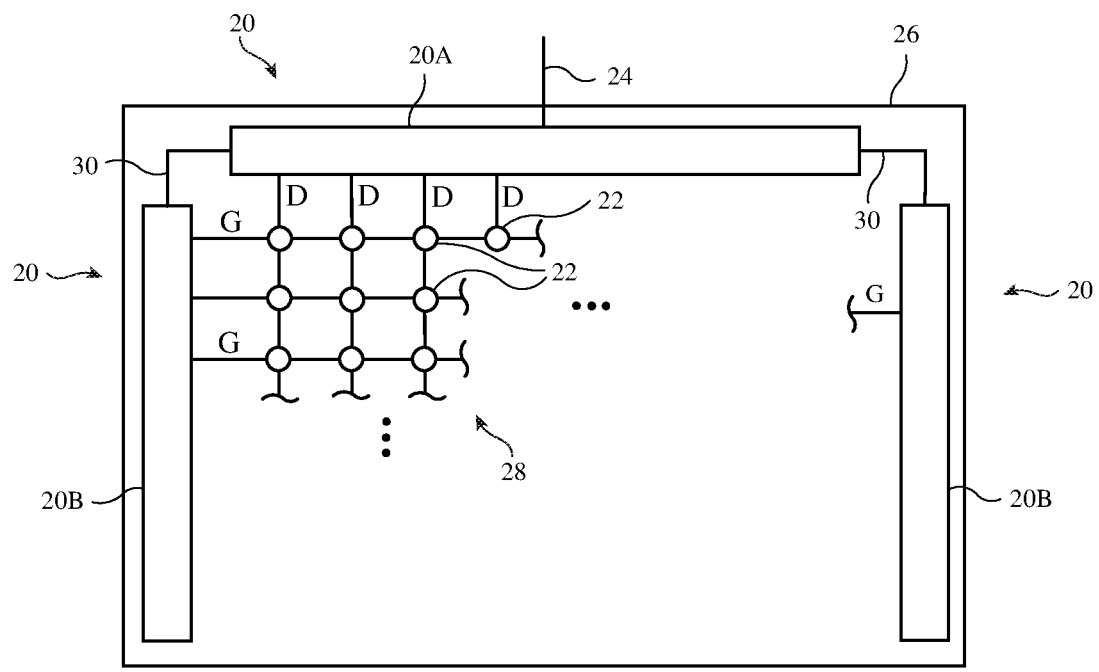
FIG. 2 is a schematic diagram of an illustrative display in accordance with an embodiment.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, silicon layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Gate driver circuitry 20B may include blocks of gate driver circuitry such as gate driver row blocks. Each gate driver row block may include circuitry such output buffers and other output driver circuitry, register circuits (e.g., registers that can be chained together to form a shift register), and signal lines, power lines, and other interconnects. Each gate driver row block may supply one or more gate signals to one or more respective gate lines in a corresponding row of the pixels of the array of pixels in the active area of display 14.

Display 14 for device 10 may be a liquid crystal display, an organic light-emitting diode display, an electrophoretic display, a plasma display, an electrowetting display, a display formed using other display technologies, or a display that uses two or more of these display technologies in a hybrid configuration.

Figure 3:
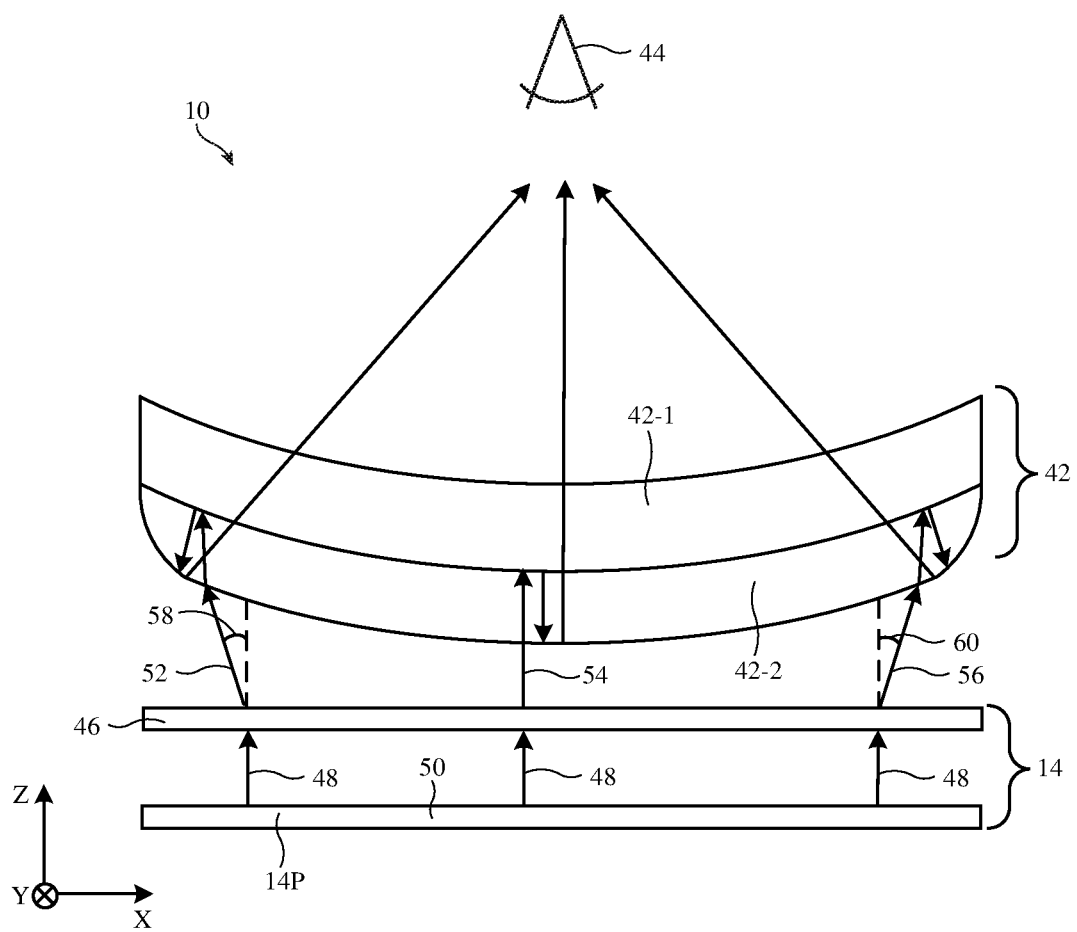
FIG. 3 is a cross-sectional side view of an illustrative electronic device including a display with a light redirecting layer and a lens assembly in accordance with an embodiment.

FIG. 3 is cross-sectional side view of an illustrative electronic device that includes a display and one or more lens elements. As shown in FIG. 3, lens assembly 42 is included in device 10 in addition to display 14. The lens assembly may optionally be a catadioptric lens assembly (e.g., a lens assembly that both reflects and refracts incident light). The lens assembly may optionally include multiple lens elements such as lens elements 42-1 and 42-2 in FIG. 3. Lens assembly 42 may focus light towards viewer 44 (who may view the display in the negative Z-direction in FIG. 3).

There are many possible arrangements for lens assembly 42. In general, the lens assembly may include one lens element, two lens elements, three elements, more than three elements, etc. Each lens element may have any desired combination of convex surfaces and concave surfaces. The convex and concave surfaces may be spherical, aspherical, cylindrical, or have any other desired curvature. The lens assembly may include other optical layers such as one or more linear polarizers, one or more quarter waveplates, one or more partial mirrors, one or more reflective polarizers, etc.

As previously mentioned, lens assembly 42 may be a catadioptric lens assembly. However, this need not be the case. The lens assembly may instead be a refractive lens assembly, may use one or more Fresnel lenses, etc.

As shown in FIG. 3, display 14 may include a display panel 14P and a light redirecting layer 46. Display panel 14P may include an array of display pixels similar to as shown in FIG. 2. The display panel may be an organic light-emitting diode display panel, a liquid crystal display panel, or a display panel including pixels formed from any other desired type of display technology.

Display panel 14P may emit light in direction 48 in FIG. 3. Direction 48 may be parallel to the Z-axis. In other words, the chief ray angle of light emitted from the display may be orthogonal to the front surface 50 of the display panel. However, the presence of lens assembly 42 may result in some light emitted in direction 48 not being focused towards the viewer (e.g., at the edges of the display). Due to its curvature, lens 42 may collect light from different angles from different portions of the display.

Therefore, display 14 also may include light redirecting layer 46. Light redirecting layer 46 may redirect at least some light from the display panel 14P to change the angle of the emitted light. The light redirecting layer may redirect light by different amounts in different portions of the display to account for the focusing properties of lens assembly 42 and optimize the device performance. Specifically, including light redirecting layer 46 mitigates viewing angle color shift (and other large angle induced artifacts) from the display. By including the light redirecting layer, light with a smaller angle (e.g., closer to on-axis) is collected by the lens assembly. This causes the viewer to perceive a more uniform color across the display.

For example, light at the left edge of the display in FIG. 3 may be redirected in direction 52. In other words, the chief ray angle of light exiting light redirecting layer 46 at this portion of the display may be in direction 52. There is an angle 58 between the light that enters the light redirecting layer (in direction 48) and the light that exits the light redirecting layer (in direction 52). Angle 58 may sometimes be referred to as a negative angle (because it is in the negative X-direction relative to the surface normal of the display/light redirecting layer).

Light at the right edge of the display in FIG. 3 may be redirected in direction 56. In other words, the chief ray angle of light exiting light redirecting layer 46 at this portion of the display may be in direction 56. There is an angle 60 between the light that enters the light redirecting layer (in direction 48) and the light that exits the light redirecting layer (in direction 56). Angle 60 may sometimes be referred to as a positive angle (because it is in the positive X-direction relative to the surface normal of the display/light redirecting layer).

Light at the left edge of the display is redirected in the negative X-direction whereas light at the right edge of the display is redirected in the positive X-direction. This may result in the light from the display being focused towards viewer 44 by the lens assembly 42, as shown in FIG. 3.

Meanwhile, light at the center of the display may not be substantially redirected by the light redirecting layer. As shown in FIG. 3, light from the center of the display may exit light redirecting layer 46 in direction 54 (that is substantially parallel to direction 48). This light may still be properly focused towards viewer 44 by the lens assembly.

To summarize, light redirecting layer 46 may selectively redirect light from the display to account for the focusing properties of the lens assembly 42 included in the electronic device. The degree and direction to which light is redirected varies as a function of position across the light redirecting layer. In the example of FIG. 3, the light redirection is at a minimum (e.g., 0 degrees) at the center of the display. With increasing distance from the center of the display, the light may be redirected by a greater amount away from the center of the display. For example, a first point on the light redirecting layer that is shifted in the positive X-direction will redirect light in the positive X-direction. The first point may be shifted form the center of the light redirecting layer by a first distance. A second point on the light redirecting layer that is shifted in the positive X-direction by a second distance that is greater than the first distance will redirect light in the positive X-direction by a greater amount (larger angle) than at the first point. A third point on the light redirecting layer that is shifted in the negative X-direction will redirect light in the negative X-direction. A fourth point on the light redirecting layer that is shifted in the positive Y-direction will redirect light in the positive Y-direction. A fifth point on the light redirecting layer that is shifted in the negative Y-direction will redirect light in the negative Y-direction.

As one example, light redirecting layer 46 may be a diffractive-type flat lens. The diffractive-type flat lens may be a geometric phase lens. A geometric phase lens is a diffractive-type lens based on geometric phase. The geometric phase lens may be achieved using liquid crystal. To form the geometric phase lens, a flat liquid crystal film may be formed on a transparent substrate (e.g., glass, plastic, etc.). The liquid crystal film may include three-dimensional patterns of liquid crystals. The liquid crystals may manipulate the polarization of optical beams passing through the liquid crystals, which modulates the geometric phase of the optical beam. The geometric phase may be modulated in a spatially varying fashion to provide desired light redirecting effects. A geometric phase lens may redirect light using polarization-dependent diffraction and therefore may be considered a diffractive-type lens.

Figure 4:
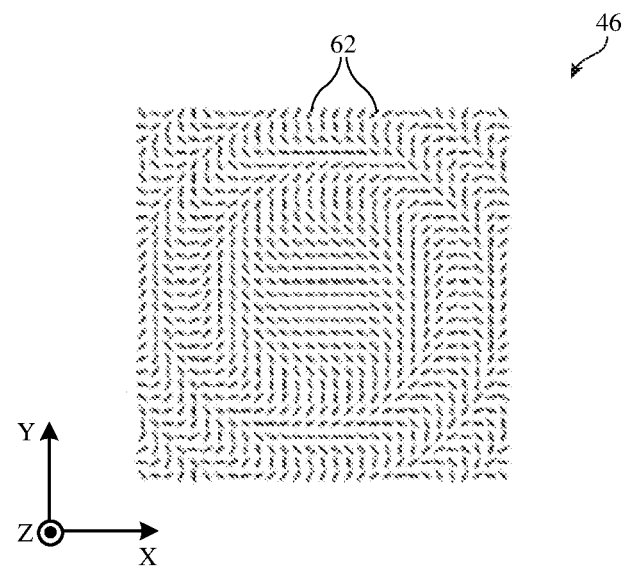
FIG. 4 is a top view of an illustrative geometric phase lens that may be used as a light redirecting layer in an electronic device of the type shown in FIG. 3 in accordance with an embodiment.

FIG. 4 is a top view of an illustrative geometric phase lens 46 that may be used in the electronic device of FIG. 3. As shown in FIG. 4, the geometric phase lens 46 may include liquid crystals 62 with different orientations. There may be multiple layers of liquid crystals in the geometric phase lens (e.g., stacked along the Z-axis). The liquid crystals may be formed on a transparent substrate with an intervening alignment film. An additional transparent substrate may optionally be formed over the liquid crystal film in the geometric phase lens.

The amount that light is redirected by geometric phase lens 46 may depend on the pitch (e.g., spacing) between liquid crystals of the same alignment. As shown in FIG. 4, concentric circles of liquid crystals having the same or similar orientations may be included in the geometric phase lens. The liquid crystal elements may have a larger pitch in the center of the phase lens (where light redirection is not desired) and a decreasing pitch towards the edges of the phase lens (where light redirection is desired).

Figure 5A:
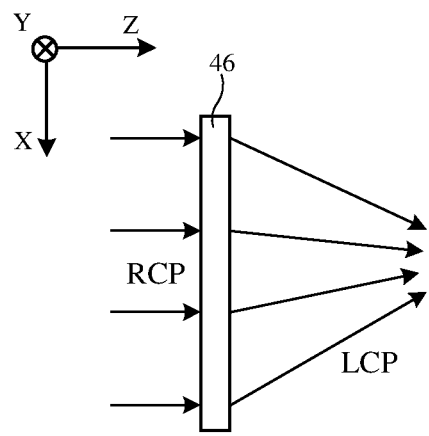
FIG. 5A is a cross-sectional side view of an illustrative geometric phase lens showing how the geometric phase lens may focus incident light that is right-hand circularly polarized in accordance with an embodiment.
Figure 5B:
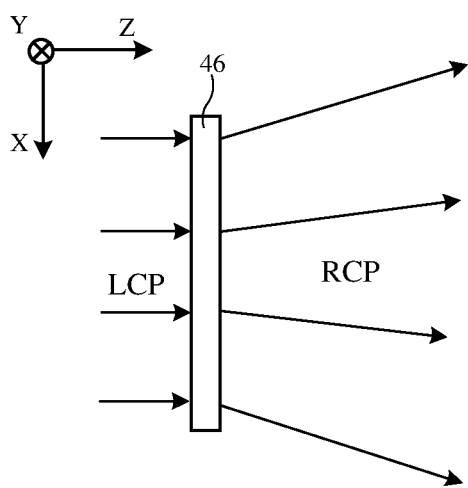
FIG. 5B is a cross-sectional side view of an illustrative geometric phase lens showing how the geometric phase lens may spread incident light that is left-hand circularly polarized in accordance with an embodiment.

FIGS. 5A and 5B are cross-sectional side views of an illustrative geometric phase lens showing how the geometric phase lens may redirect light. In the example of FIG. 5A, the geometric phase lens may receive incident light that is right-hand circularly polarized (RCP). This type of light may be focused to a focal point (e.g., f>0) by the geometric phase lens. The output light may be left-hand circularly polarized (LCP). This light may be referred to as a +1 order image.

In contrast, when the geometric phase lens receives incident light that is left-hand circularly polarized (LCP), as in FIG. 5B, the light may be spread (e.g., f<0) by the geometric phase lens. The output light may be right-hand circularly polarized (RCP). This light may be referred to as a −1 order image.

Therefore, if the incident light received by the geometric phase lens is all left-hand circular polarized, the light will be spread (as in FIG. 5B). If the incident light received by the geometric phase lens is all right-hand circular polarized, the light will be focused (as in FIG. 5A). If the incident light received by the geometric phase lens is linearly polarized or unpolarized, approximately half of the light will be spread (as in FIG. 5B) and approximately half of the light will be focused (as in FIG. 5A). In other words, two separate images (e.g., a +1 order image and a −1 order image) will be produced by the geometric phase lens. The example of RCP light being focused and LCP light being spread in FIGS. 5A and 5B is merely illustrative. The reverse arrangement may instead be used, with LCP light being focused and RCP light being spread.

The example of forming the geometric phase lens using liquid crystal is merely illustrative. In another possible embodiment, the geometric phase lens may be formed using a metasurface. The metasurface may include shaped nanostructures that modify the phase of incident light. The nanostructures may have a thickness of less than 200 nanometers, less than 100 nanometers, less than 50 nanometers, less than 20 nanometers, less than 10 nanometers, etc. The nanostructures may have a longest dimension (e.g., length) of less than 1 micron, less than 2 microns, less than 0.5 microns, less than 0.1 microns, etc.).

The example of using a geometric phase lens for the light redirecting layer 46 is merely illustrative. The light redirecting layer 46 may be formed from any desired optical layer that can redirect light in the manner desired (e.g., spatially varying redirection). A holographic optical element or a diffraction lens with a varying refractive index may be used, as some additional examples.

The geometric phase lens shown herein may have the advantage of being flat (e.g., with planar upper and lower surfaces that are parallel to the surface of the display panel) and may be very thin. The geometric phase lens therefore adds minimal volume and weight to the device. The thickness of the active layer (e.g., the liquid crystal layer) in the geometric phase lens may be less than 20 microns, less than 10 microns, less than 5 microns, less than 3 microns, less than 1 micron, between 1 and 10 microns, greater than 1 micron, etc. The total thickness of the geometric phase lens (including the transparent substrate, one or more alignment layers, an optional additional substrate, etc.) may be less than 10 microns, less than 20 microns, less than 50 microns, less than 100 microns, less than 500 microns, between 10 and 100 microns, greater than 10 microns, greater than 30 microns, etc.

There are many ways to incorporate the light redirecting layer into display 14. FIGS. 6-12 show various stack-ups for a display that includes the light redirecting layer. For each one of FIGS. 6-12, the light redirecting layer may redirect light in a spatially dependent manner (as shown and discussed in connection with FIG. 3).

Figure 6:
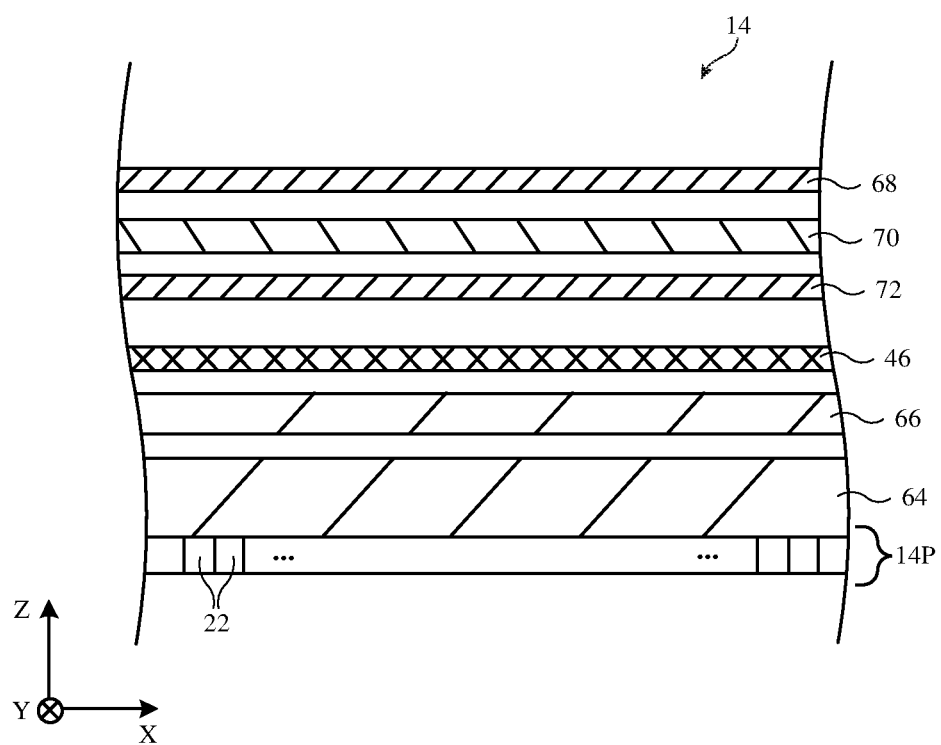
FIG. 6 is a cross-sectional side view of an illustrative display with a geometric phase lens, a circular polarizer, and an additional quarter waveplate that are formed over seal glass in accordance with an embodiment.

FIG. 6 is a cross-sectional side view of a display with a geometric phase lens, a circular polarizer, and an additional quarter waveplate. As shown in FIG. 6, display 14 includes a display panel 14P with a plurality of display pixels 22. As previously discussed, the display panel 14P may be formed using any desired type of display technology (e.g., an OLED display, LCD, etc.).

The display panel may be covered by encapsulation layer 64. Encapsulation layer 64 may be formed from a transparent material such as glass and may therefore sometimes be referred to as encapsulation glass 64. Encapsulation glass 64 may encapsulate and protect the underlying display panel.

An additional transparent layer 66 may be formed over encapsulation layer 64. Transparent layer 66 may also be formed from glass and may sometimes be referred to as glass layer 66, seal glass 66, seal layer 66, etc. Seal glass 66 may provide a moisture barrier for the underlying display panel.

Display 14 also includes light redirecting layer 46, a quarter waveplate 68, a linear polarizer 70, and an additional quarter waveplate 72. Light redirecting layer 46 is interposed between seal glass 66 and quarter waveplate 72. Quarter waveplate 72 is interposed between light redirecting layer 46 and linear polarizer 70. Linear polarizer 70 is interposed between quarter waveplate 72 and quarter waveplate 68.

Depending on the design of the geometric phase lens, quarter waveplates 68 and 72 may have optical axes that are orthogonal, parallel, or at any other desired angle. In one example, quarter waveplate 72 may have an optical axis that is at an angle of 45 degrees whereas quarter waveplate 68 may have an orthogonal optical axis that is at an angle of −45 degrees. As another example, quarter waveplates 72 and 68 may both have parallel optical axes that are both at 45-degree angles. Quarter waveplate 72 may help mitigate ghosting (e.g., a second image that is shifted relative to a first, primary image) in the display. The light exiting light redirecting layer 46 may have a right-hand circularly polarized component and a left-hand circularly polarized component.

Quarter waveplate 72 may rotate one of the components (e.g., the right-hand circularly polarized component) such that the light is linearly polarized in a direction orthogonal to the pass axis of linear polarizer 70. Therefore, this light is absorbed by linear polarizer 70. Quarter waveplate 72 may rotate the other one of the components (e.g., the left-hand circularly polarized component) such that the light is linearly polarized in a direction parallel to the pass axis of linear polarizer 70. Therefore, this light passes through linear polarizer 70. Quarter waveplate 72 therefore selects only one of the two images from geometric phase lens 46 to be emitted from the display. In this case, the quarter waveplate may select the image that is spread by the geometric phase lens instead of the image that is focused by the geometric phase lens (since this is intended to be the primary image for the display).

Quarter waveplate 72 may optionally include an additional +C layer (sometimes referred to as a positive C-plate) that faces light redirecting layer 46 to improve performance at large viewing angles. A positive C-plate is a birefringent layer that has its extraordinary axis oriented perpendicular to the plane of the plate (e.g., parallel to the Z-axis and perpendicular to the XY-plane in FIG. 6).

Quarter waveplate 68 ensures that light that exits the display is circularly polarized. The quarter waveplate 68 receives linearly polarized light from linear polarizer 70 and outputs circularly polarized light. In the example of FIG. 6, geometric phase lens 46 may receive unpolarized light and the display ultimately outputs right-hand circularly polarized light from quarter waveplate 68.

Quarter waveplate 68 and linear polarizer 70 may sometimes collectively be referred to as a circular polarizer. The circular polarizer may mitigate reflections in the electronic device. For example, display light may exit the display towards lens assembly 42. Some of this light may be reflected back towards display 14. The circular polarizer absorbs the stray light to prevent the stray light from reflecting off the display towards the viewer.

The stack-up of the display in FIG. 6 is merely illustrative. In another possible arrangement, shown in FIG. 7, light redirecting layer 46 is positioned underneath seal glass 66. The light redirecting layer 46 is interposed between seal glass 66 and encapsulation glass 64. The seal glass 66 is positioned between light redirecting layer 46 and quarter waveplate 72. The position and functionality of quarter waveplate 68, linear polarizer 70, and quarter waveplate 72 is unchanged relative to FIG. 6.

Figure 8:
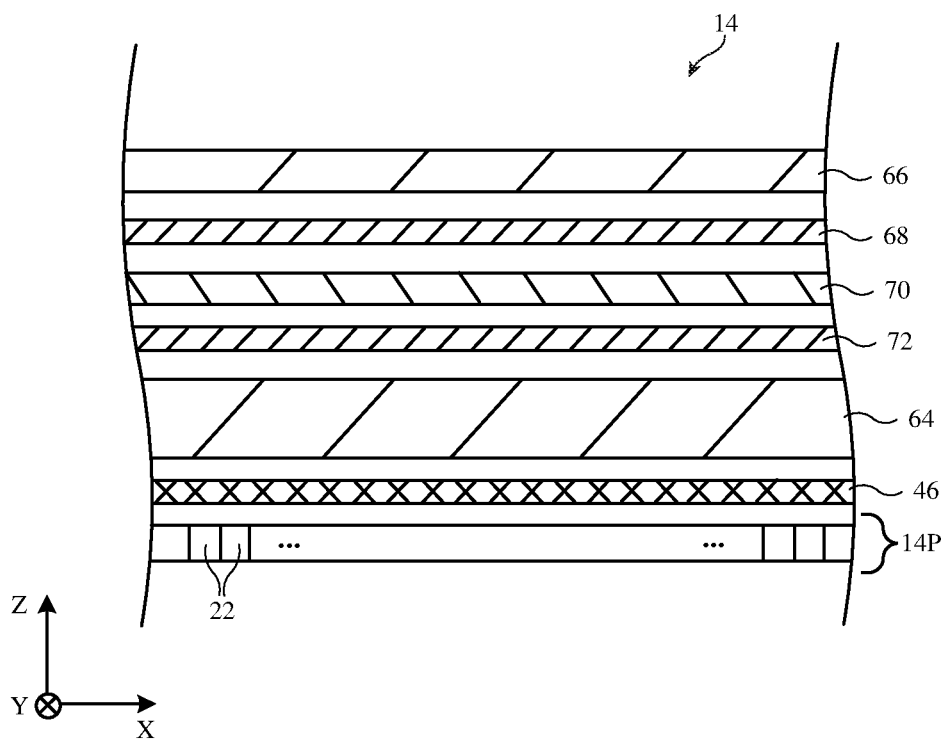
FIG. 8 is a cross-sectional side view of an illustrative display with a geometric phase lens formed between encapsulation glass and a display panel, a circular polarizer, and an additional quarter waveplate in accordance with an embodiment.

In yet another possible arrangement, shown in FIG. 8, light redirecting layer 46 is positioned underneath encapsulation glass 64. Light redirecting layer 46 is interposed between display panel 14P and encapsulation glass 64. Encapsulation glass 64 is interposed between light redirecting layer 46 and quarter waveplate 72. The order and functionality of quarter waveplate 68, linear polarizer 70, and quarter waveplate 72 is the same as in FIG. 6. However, seal glass 66 is positioned on top of quarter waveplate 68 in FIG. 8 such that quarter waveplate 68 is interposed between linear polarizer 70 and seal glass 66.

Figure 7:
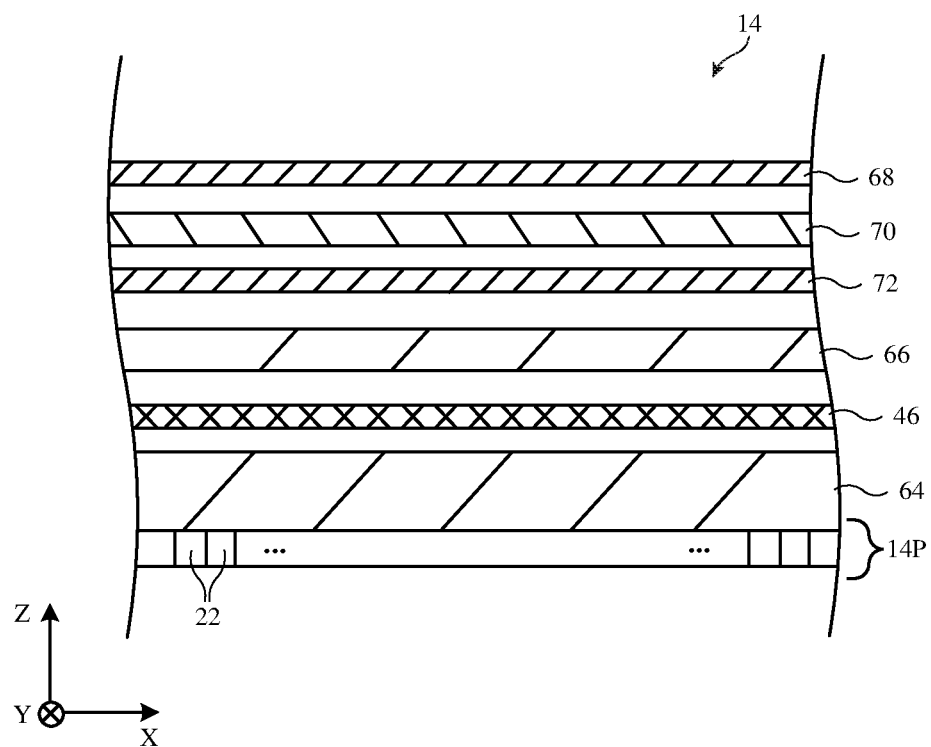
FIG. 7 is a cross-sectional side view of an illustrative display with a geometric phase lens formed between encapsulation glass and seal glass, a circular polarizer, and an additional quarter waveplate in accordance with an embodiment.

Positioning the geometric phase lens 46 closer to the display panel may improve field of view scarification, ghosting/contrast, and lateral chromatic aberration. The arrangement of FIG. 8 (where the geometric phase lens is adjacent to display panel 46) may therefore have the best performance for improving field of view scarification, ghosting/contrast, and lateral chromatic aberration, followed by the arrangement of FIG. 7 (where the geometric phase lens is interposed between the encapsulation glass and the seal glass), followed by the arrangement of FIG. 6 (where the geometric phase lens is above both the encapsulation glass and the seal glass). However, manufacturing considerations may still favor the arrangements of FIG. 6 or 7 in some scenarios. In FIG. 6, the geometric phase lens may be formed as a coating on the seal glass and may be integrated into the polarizer stack-up. This may have the least disruption to the display manufacturing process. In FIG. 7, the geometric phase lens may be laminated or coated onto the lower surface of the seal glass (as an example). In FIG. 8, the geometric phase lens may be laminated or coated onto the lower surface of the encapsulation glass (as an example). One of these processes may be preferred from a manufacturing perspective depending on the application.

The example of FIGS. 6-8 of the display including two quarter waveplates and one linear polarizer is merely illustrative. In other possible arrangements, shown in FIGS. 9 and 10, the display may include three quarter waveplates and two linear polarizers.

Figure 9:
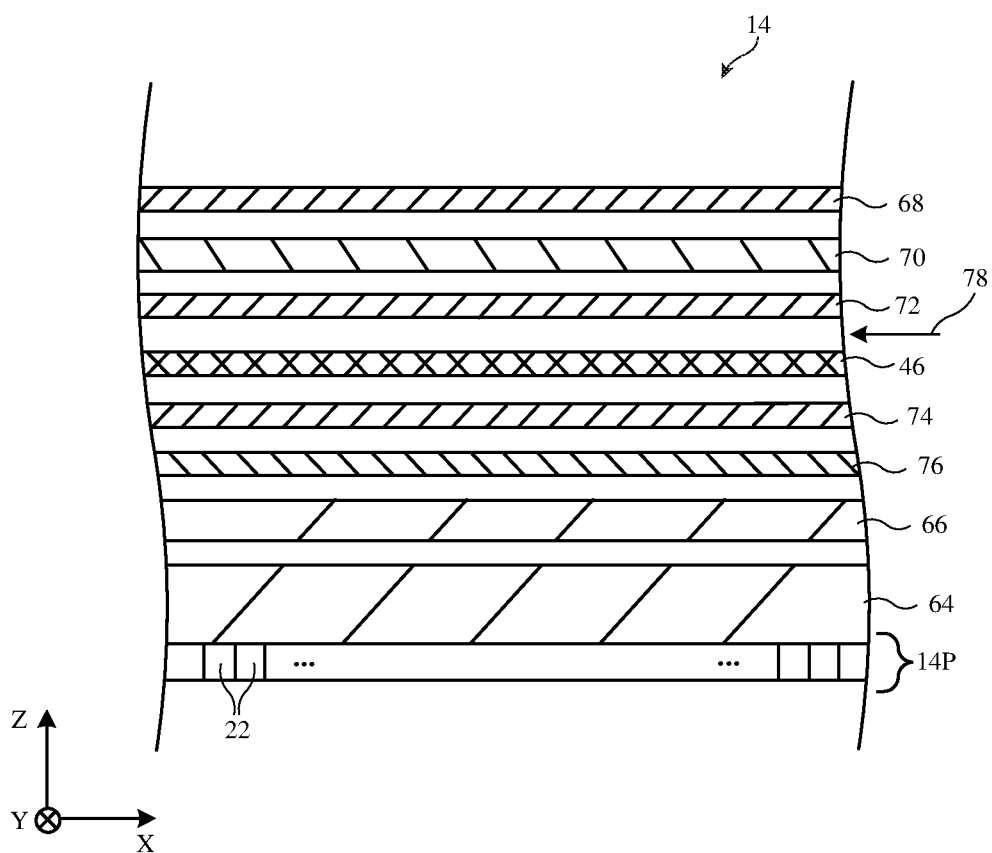
FIG. 9 is a cross-sectional side view of an illustrative display with a geometric phase lens, first and second circular polarizers, and an additional quarter waveplate that are formed over seal glass in accordance with an embodiment.

As shown in FIG. 9, display 14 may include a display panel 14P, encapsulation glass 64, and seal glass 66 (similar to as in FIG. 6). Additionally, the display may include a light redirecting layer 46, quarter waveplate 72, linear polarizer 70, and quarter waveplate 68 having a similar arrangement (e.g., the same stack-up order) as in FIG. 6. However, the display of FIG. 9 includes an additional quarter waveplate 74 and linear polarizer 76. Linear polarizer 76 is interposed between quarter waveplate 74 and seal glass 66. Quarter waveplate 74 is interposed between light redirecting layer 46 and linear polarizer 76.

Linear polarizer 76 and quarter waveplate 74 may sometimes collectively be referred to as a circular polarizer. Light from display panel 14P may become linearly polarized upon passing through linear polarizer 76, then circularly polarized upon passing through quarter waveplate 74. The light redirecting layer 46 therefore receives incident light that is circularly polarized. By providing circularly polarized light of a certain type to geometric phase lens 46, ghosting may be mitigated (because the geometric phase lens may only output the −1 order divergent image as in FIG. 5B and not the +1 order focused image as in FIG. 5A, as an example). Quarter waveplate 72 may additionally mitigate ghosting as previously discussed in connection with FIG. 6. The circular polarizer formed by linear polarizer 70 and quarter waveplate 68 may ensure that the light is output from the display with a circular polarization and may mitigate reflections as previously discussed.

Quarter waveplate 74 may have an optical axis that is orthogonal to the optical axis of waveplate 72. The optical axis of quarter waveplate 74 may be parallel to the optical axis of quarter waveplate 68.

The example in FIG. 9 of seal glass 66 being adjacent to encapsulation glass 64 is merely illustrative. In another possible arrangement, seal glass 66 may be moved to position 78 in FIG. 9. At this position, the seal glass is interposed between geometric phase lens 46 and quarter waveplate 72 (similar to as shown in FIG. 7). The order of the other layers may remain the same (e.g., with linear polarizer 76 now interposed between encapsulation glass 64 and quarter waveplate 74, quarter waveplate 72 now interposed between seal glass 66 and linear polarizer 70, etc.).

Figure 10:
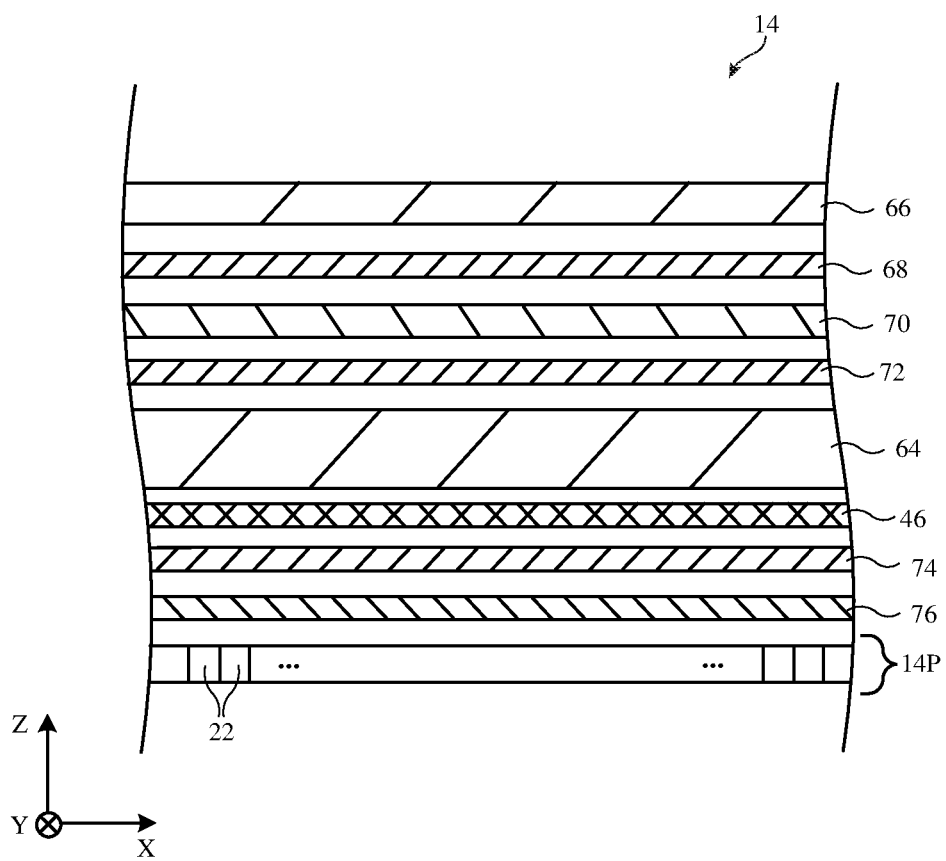
FIG. 10 is a cross-sectional side view of an illustrative display with a geometric phase lens and circular polarizer formed between encapsulation glass and a display panel, an additional circular polarizer, and an additional quarter waveplate in accordance with an embodiment.

In yet another possible arrangement, shown in FIG. 10, light redirecting layer 46, linear polarizer 76, and quarter waveplate 74 are positioned underneath encapsulation glass 64. Linear polarizer 76 is interposed between display panel 14P and quarter waveplate 74. Quarter waveplate 74 is interposed between linear polarizer 76 and geometric phase lens 46. Geometric phase lens 46 is interposed between quarter waveplate 74 and encapsulation glass 64. The order and functionality of geometric phase lens 46, quarter waveplate 74, and linear polarizer 76 is the same as in FIG. 9. The order and functionality of quarter waveplate 68, linear polarizer 70, quarter waveplate 72 is also the same as in FIG. 9. However, seal glass 66 is positioned on top of quarter waveplate 68 in FIG. 10 such that quarter waveplate 68 is interposed between linear polarizer 70 and seal glass 66.

Due to the circular polarizer formed by linear polarizer 76 and quarter waveplate 74, the arrangements of FIGS. 9 and 10 may all have similarly effective ghosting/contrast improvements. Similar to as discussed in connection with FIGS. 6-8, positioning the geometric phase lens 46 closer to the display panel may improve field of view scarification and lateral chromatic aberration. Similar manufacturing considerations apply to the arrangements of FIGS. 9 and 10 as discussed in connection with FIGS. 6-8.

Figure 11:
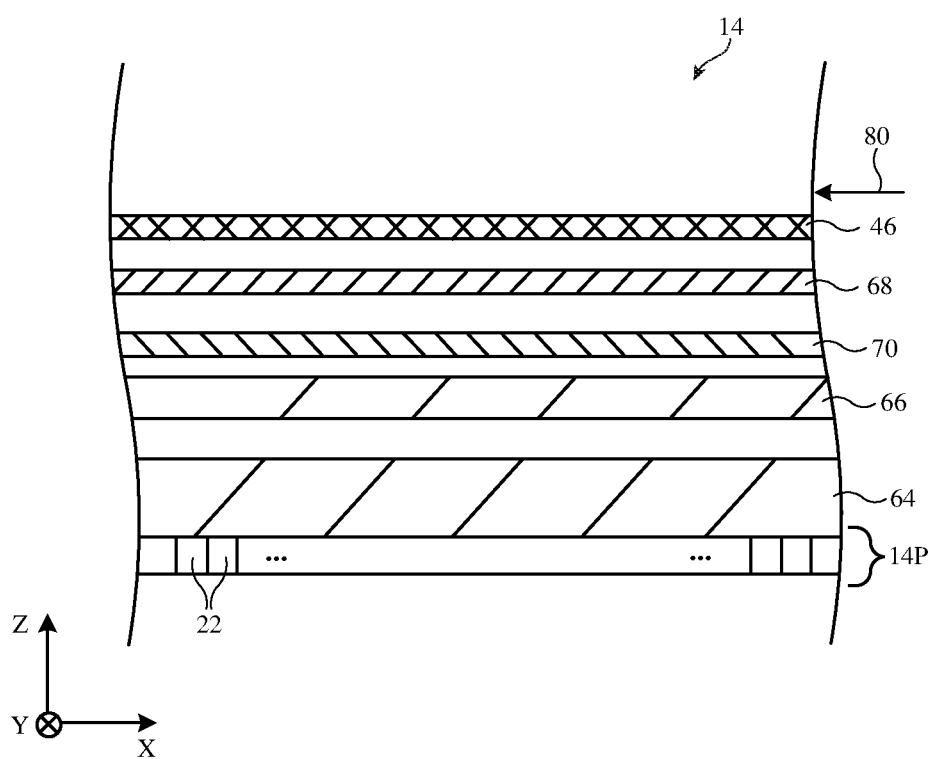
FIG. 11 is a cross-sectional side view of an illustrative display with a geometric phase lens and a circular polarizer that are formed over seal glass in accordance with an embodiment.

FIG. 11 is a cross-sectional side view of an illustrative display with the geometric phase lens 46 formed above linear polarizer 70 and quarter waveplate 68. As shown in FIG. 11, display 14 may include a display panel 14P, encapsulation glass 64, and seal glass 66 (similar to as in FIG. 6). Additionally, the display may include a light redirecting layer 46, linear polarizer 70, and quarter waveplate 68. Linear polarizer 70 is interposed between seal glass 66 and quarter waveplate 68. Quarter waveplate 68 is interposed between linear polarizer 70 and geometric phase lens 46.

Quarter waveplate 68 and linear polarizer 70 may sometimes collectively be referred to as a circular polarizer. The circular polarizer may receive light from display panel 14P and provide circularly polarized light to geometric phase lens 46. Geometric phase lens may spread the light in a spatially varying manner.

The arrangement of FIG. 11 has the advantage of being a 'drop-in' solution, meaning that the geometric phase lens may be added to the display once the rest of display manufacturing is complete. This may enable easier manufacturing.

The example in FIG. 11 of seal glass 66 being adjacent to encapsulation glass 64 is merely illustrative. In another possible arrangement, seal glass 66 may be moved to position in FIG. 11. At this position, the seal glass is formed above and adjacent to geometric phase lens 46 (similar to as shown in FIG. 7). The order of the other layers may remain the same (e.g., with linear polarizer 70 now interposed between encapsulation glass 64 and quarter waveplate 68, geometric phase lens 46 now interposed between seal glass 66 and quarter waveplate 68, etc.).

Figure 12:
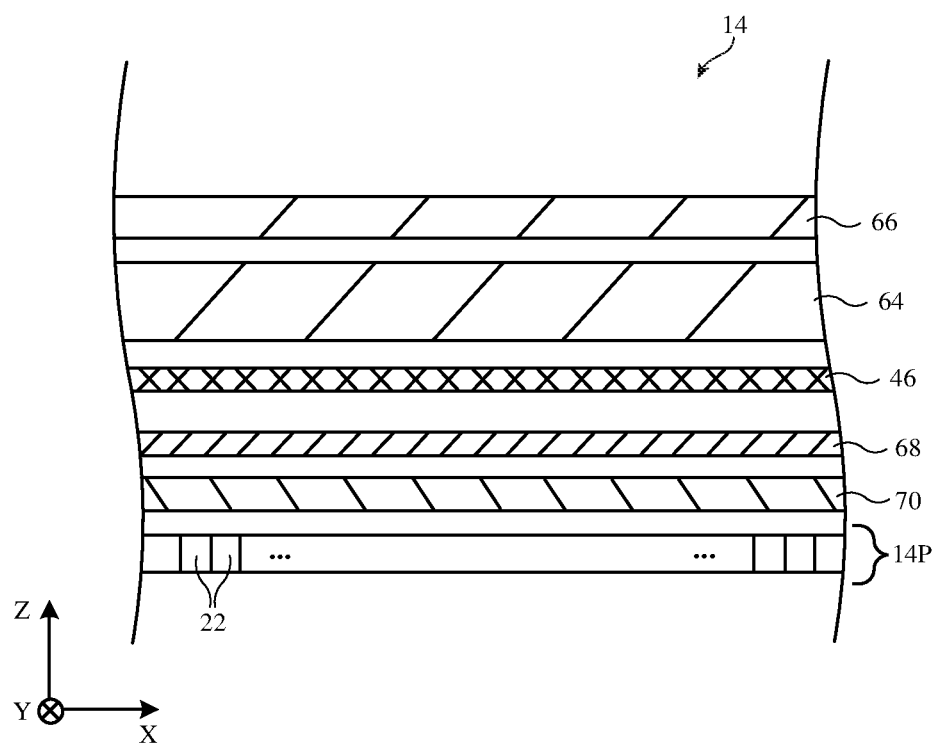
FIG. 12 is a cross-sectional side view of an illustrative display with a geometric phase lens and a circular polarizer formed between encapsulation glass and a display panel in accordance with an embodiment.

In yet another possible arrangement, shown in FIG. 12, light redirecting layer 46, linear polarizer 70, and quarter waveplate 68 are positioned underneath encapsulation glass 64. Linear polarizer 70 is interposed between display panel 14P and quarter waveplate 68. Quarter waveplate 68 is interposed between linear polarizer 70 and geometric phase lens 46. Geometric phase lens 46 is interposed between quarter waveplate 68 and encapsulation glass 64. The order and functionality of geometric phase lens 46, quarter waveplate 68, and linear polarizer 70 is the same as in FIG. 12.

Similar to as discussed in connection with FIGS. 6-8, positioning the geometric phase lens 46 closer to the display panel may improve field of view scarification and lateral chromatic aberration.

The stack-ups of FIGS. 6-12 are merely illustrative. In general, the encapsulation glass and seal glass may be positioned at any desired points within the stack-up.

Figure 13A:
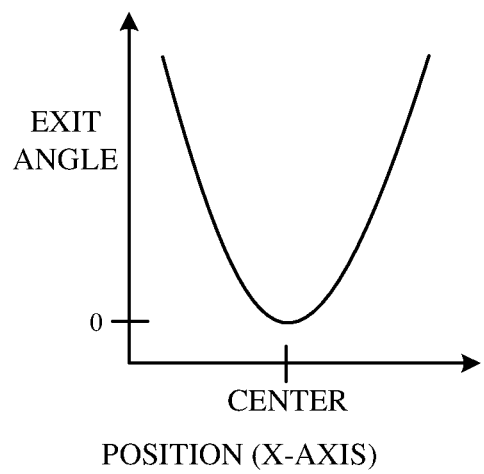
FIGS. 13A and 13B are graphs showing how the light redirecting layer of FIGS. 6-12 may redirect light with increasing magnitude as the distance from the center of the light spreading layer increases in accordance with an embodiment.
Figure 13B:
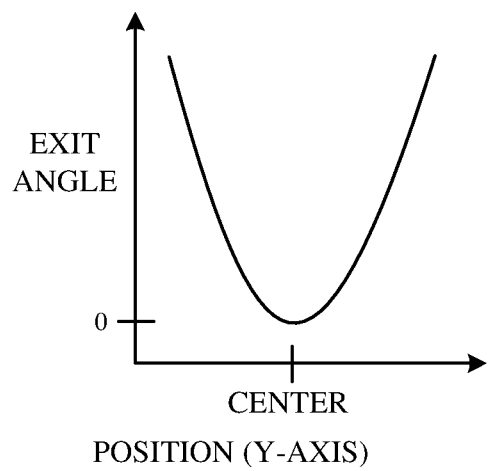

FIGS. 13A and 13B are graphs showing how the light redirecting layer of FIGS. 6-12 may redirect light with increasing magnitude as the distance from the center of the light spreading layer increases. FIG. 13A shows the magnitude of the exit angle of light varying across the light redirecting layer in the X-direction. The incident light may have an angle of 0 degrees (e.g., parallel to the Z-axis as shown by direction 48 in FIG. 3). At the center of the light redirecting layer, the light is not redirected so the exit angle remains 0, as shown in FIG. 13A. With increasing distance away from the center of the light redirecting layer towards the edges of the light redirecting layer, the magnitude of the exit angle increases. The exit angle may increase linearly or according to any other desired function (e.g., parabolically, non-linearly, etc.). The direction of the exit angle may be away from the center of the light redirecting layer. For example, at a point that is shifted in the positive X-direction from the center of the light redirecting layer, light will be angled in the positive X-direction. At a point that is shifted in the negative X-direction from the center of the light redirecting layer, light will be angled in the negative X-direction.

FIG. 13B shows the magnitude of the exit angle of light varying across the light redirecting layer in the Y-direction. The incident light may have an angle of 0 degrees (e.g., parallel to the Z-axis as shown by direction 48 in FIG. 3). At the center of the light redirecting layer, the light is not redirected so the exit angle remains 0, as shown in FIG. 13B. With increasing distance away from the center of the light redirecting layer towards the edges of the light redirecting layer, the magnitude of the exit angle increases. The exit angle may increase linearly or according to any other desired function (e.g., parabolically, non-linearly, etc.). The direction of the exit angle may be away from the center of the light redirecting layer. For example, at a point that is shifted in the positive Y-direction from the center of the light redirecting layer, light will be angled in the positive Y-direction. At a point that is shifted in the negative Y-direction from the center of the light redirecting layer, light will be angled in the negative Y-direction.

Light may be shifted in both the X-direction and Y-direction by the geometric phase lens. As one example, at a point that is shifted in the negative Y-direction and the positive X-direction from the center of the light redirecting layer, light will be angled in the negative Y-direction and the positive X-direction.

Selectively spreading the light in this fashion may allow light to be provided to the lens assembly in the device at optimal angles across the lens assembly. The light redirecting layer may be a geometric phase lens, which has a high transparency, high optical power, and high efficiency all while being very thin. The light redirecting layer therefore improves display performance without adding excess bulk to the display.

It should be noted that, in some cases, the center of the light redirecting layer (e.g., the point at which light is not redirected) may be aligned (overlapping) with the center of the display panel and the corresponding pixel array. Alternatively, the center of the light redirecting layer may be shifted relative to the center of the display panel to account for the geometry of the particular lens assembly.

In FIGS. 6-12, the layers of display 14 are depicted as having intervening gaps. This example is merely illustrative. In general, any two adjacent layers within the display may be laminated together directly, may be attached together with an adhesive (e.g., an optically clear adhesive), or may be separated by an air gap.

In accordance with an embodiment, an electronic device is provided that includes a display panel including an array of pixels, a lens assembly; and a geometric phase lens that is interposed between the display panel and the lens assembly, the geometric phase lens redirects light by different amounts at different positions on the geometric phase lens and at least some light from the display panel passes through the geometric phase lens to the lens assembly.

In accordance with another embodiment, the geometric phase lens has a center and an edge, the geometric phase lens is configured to redirect the light from the display panel by a first amount at the center of the geometric phase lens, and the geometric phase lens is configured to redirect the light from the display panel by a second amount that is different than the first amount at the edge of the geometric phase lens.

In accordance with another embodiment, the geometric phase lens does not substantially redirect light at a center of the geometric phase lens and the geometric phase lens redirects light at an angle having a magnitude that increases with increasing distance from the center of the geometric phase lens.

In accordance with another embodiment, the geometric phase lens has a center and selectively redirects light away from the center depending on a position within the geometric phase lens.

In accordance with another embodiment, the electronic device includes a circular polarizer, the geometric phase lens is interposed between the display panel and the circular polarizer.

In accordance with another embodiment, the electronic device includes a quarter waveplate, the quarter waveplate is interposed between the circular polarizer and the geometric phase lens.

In accordance with another embodiment, the quarter waveplate is a first quarter waveplate, the circular polarizer includes a linear polarizer and a second quarter waveplate, and the linear polarizer is interposed between the first quarter waveplate and the second quarter waveplate.

In accordance with another embodiment, the first and second quarter waveplates have orthogonal optical axes.

In accordance with another embodiment, the first and second quarter waveplates have parallel optical axes.

In accordance with another embodiment, the electronic device includes an additional circular polarizer, the additional circular polarizer is interposed between the geometric phase lens and the display panel.

In accordance with another embodiment, the electronic device includes a circular polarizer, the circular polarizer is interposed between the display panel and the geometric phase lens.

In accordance with another embodiment, the geometric phase lens includes a liquid crystal film.

In accordance with an embodiment, an electronic device is provided that includes a display panel including an array of pixels that emit light; at least one lens element; and a light redirecting layer, the light from the array of pixels passes through the light redirecting layer to the lens assembly, and the light redirecting layer selectively redirects the light by different amounts across the light redirecting layer.

In accordance with another embodiment, the light redirecting layer includes a liquid crystal film.

In accordance with another embodiment, the light redirecting layer is a diffractive-type flat lens.

In accordance with another embodiment, the light redirecting layer has a center and the light redirecting layer redirects the light away from the center at an angle that increases in magnitude as a distance from the center increases.

In accordance with another embodiment, the electronic device includes a first quarter waveplate; a linear polarizer; and a second quarter waveplate, the linear polarizer is interposed between the first and second quarter waveplates, the second quarter waveplate is interposed between the light redirecting layer and the linear polarizer, and the light redirecting layer is interposed between the display panel and the second quarter waveplate.

In accordance with another embodiment, the electronic device includes a first quarter waveplate; a first linear polarizer; a second quarter waveplate; a third quarter waveplate; and a second linear polarizer, the light redirecting layer has first and second opposing sides, the first quarter waveplate, the first linear polarizer, and the second quarter waveplate are formed on the first side, and the second quarter waveplate and the third quarter waveplate are formed on the second side.

In accordance with an embodiment, an electronic device is provided that includes a display panel including an array of pixels; and a geometric phase lens that receives light from the array of pixels, the geometric phase lens has a center and selectively redirects the light away from the center depending on a position within the geometric phase lens.

In accordance with another embodiment, the geometric phase lens has an edge, the geometric phase lens is configured to redirect the light by a first amount at the center, and the geometric phase lens is configured to redirect the light by a second amount that is greater than the first amount at the edge.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
    a display panel comprising an array of pixels;
    a lens assembly;
    a geometric phase lens that is interposed between the display panel and the lens assembly, wherein the geometric phase lens redirects light by different amounts at different positions on the geometric phase lens and wherein at least some light from the display panel passes through the geometric phase lens to the lens assembly;
    an encapsulation layer overlapping the display panel; and
    a moisture barrier interposed between the encapsulation layer and the lens assembly, wherein the geometric phase lens is interposed between the encapsulation layer and the moisture barrier.

2. The electronic device defined in claim 1, wherein the geometric phase lens has a center and an edge, wherein the geometric phase lens is configured to redirect the light from the display panel by a first amount at the center of the geometric phase lens, and wherein the geometric phase lens is configured to redirect the light from the display panel by a second amount that is different than the first amount at the edge of the geometric phase lens.

3. The electronic device defined in claim 1, wherein the geometric phase lens does not substantially redirect light at a center of the geometric phase lens and wherein the geometric phase lens redirects light at an angle having a magnitude that increases with increasing distance from the center of the geometric phase lens.

4. The electronic device defined in claim 1, wherein the geometric phase lens has a center and selectively redirects light away from the center depending on a position within the geometric phase lens.

5. The electronic device defined in claim 1, further comprising:
   a circular polarizer, wherein the geometric phase lens is interposed between the display panel and the circular polarizer.

6. The electronic device defined in claim 5, further comprising:
   a quarter waveplate, wherein the quarter waveplate is interposed between the circular polarizer and the geometric phase lens.

7. The electronic device defined in claim 6, wherein the quarter waveplate is a first quarter waveplate, wherein the circular polarizer comprises a linear polarizer and a second quarter waveplate, and wherein the linear polarizer is interposed between the first quarter waveplate and the second quarter waveplate.

8. The electronic device defined in claim 7, wherein the first and second quarter waveplates have orthogonal optical axes.

9. The electronic device defined in claim 7, wherein the first and second quarter waveplates have parallel optical axes.

10. The electronic device defined in claim 1, wherein the moisture barrier comprises a glass layer.

11. The electronic device defined in claim 1, wherein the encapsulation layer comprises a glass layer.

12. The electronic device defined in claim 1, wherein the geometric phase lens comprises a liquid crystal film.

13. An electronic device comprising:
    a display panel comprising an array of pixels that emit light;
    at least one lens element; and
    a light redirecting layer with a center, wherein the light from the array of pixels passes through the light redirecting layer to the lens assembly and wherein the light redirecting layer redirects the light away from the center at an angle that increases in magnitude as a first distance from the center in a first direction increases and as a second distance from the center in a second direction orthogonal to the first direction increases.

14. The electronic device defined in claim 13, wherein the light redirecting layer comprises a liquid crystal film.

15. The electronic device defined in claim 13, wherein the light redirecting layer is a diffractive-type flat lens.

16. The electronic device defined in claim 13, wherein the angle increases in magnitude according to a function selected from the group consisting of: a linear function, a parabolic function, and a non-linear function.

17. The electronic device defined in claim 13, further comprising:
    a first quarter waveplate;
    a linear polarizer; and
    a second quarter waveplate, wherein the linear polarizer is interposed between the first and second quarter waveplates, wherein the second quarter waveplate is interposed between the light redirecting layer and the linear polarizer, and wherein the light redirecting layer is interposed between the display panel and the second quarter waveplate.

18. The electronic device defined in claim 13, further comprising:
    a first quarter waveplate;
    a first linear polarizer;
    a second quarter waveplate;
    a third quarter waveplate; and
    a second linear polarizer, wherein the light redirecting layer has first and second opposing sides, wherein the first quarter waveplate, the first linear polarizer, and the second quarter waveplate are formed on the first side, and wherein the second linear polarizer and the third quarter waveplate are formed on the second side.

* * * * *